(12) United States Patent
Lee et al.

(10) Patent No.: US 7,230,670 B2
(45) Date of Patent: Jun. 12, 2007

(54) METHOD FOR FABRICATING LCD

(75) Inventors: Sang Seok Lee, Taegu-kwangyokshi (KR); Sang Ho Park, Pusan-kwangyokshi (KR); Lim Su Lee, Taegu-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 38 days.

(21) Appl. No.: 10/184,087

(22) Filed: Jun. 28, 2002

(65) Prior Publication Data
US 2003/0067581 A1  Apr. 10, 2003

(30) Foreign Application Priority Data
Oct. 5, 2001 (KR) ............ P 2001-61474
Feb. 16, 2002 (KR) ............ P 2002-8319
Feb. 18, 2002 (KR) ............ P 2002-8424

(51) Int. Cl.
*G02F 1/13* (2006.01)
(52) U.S. Cl. .......... 349/187; 349/153; 349/158
(58) Field of Classification Search .......... 349/58, 349/123, 153, 158, 130, 187, 154
See application file for complete search history.

(56) References Cited

U.S. PATENT DOCUMENTS

| | | | |
|---|---|---|---|
| 3,978,580 A * | 9/1976 | Leupp et al. | |
| 4,094,058 A | 6/1978 | Yasutake et al. | |
| 4,653,864 A * | 3/1987 | Baron | |
| 4,691,995 A | 9/1987 | Yamazaki et al. | |
| 4,775,225 A * | 10/1988 | Tsuboyama et al. | |
| 5,247,377 A | 9/1993 | Omeis et al. | |
| 5,263,888 A * | 11/1993 | Ishihara et al. | |
| 5,307,190 A * | 4/1994 | Wakita et al. | 349/158 |
| 5,379,139 A * | 1/1995 | Sato et al. | |
| 5,406,399 A * | 4/1995 | Koike | 349/58 |
| 5,406,989 A * | 4/1995 | Abe | |
| 5,499,128 A * | 3/1996 | Hasegawa et al. | |
| 5,507,323 A * | 4/1996 | Abe | |
| 5,511,591 A | 4/1996 | Abe | |
| 5,539,545 A * | 7/1996 | Shimizu et al. | |
| 5,548,429 A * | 8/1996 | Tsujita | |
| 5,642,214 A | 6/1997 | Ishii et al. | |
| 5,680,189 A * | 10/1997 | Shimizu et al. | 349/123 |
| 5,742,370 A | 4/1998 | Kim et al. | |
| 5,757,451 A * | 5/1998 | Miyazaki et al. | |
| 5,852,484 A * | 12/1998 | Inoue et al. | |
| 5,854,664 A * | 12/1998 | Inoue et al. | |
| 5,861,932 A * | 1/1999 | Inata et al. | |
| 5,875,922 A | 3/1999 | Chastine et al. | |
| 5,952,676 A | 9/1999 | Sato | |
| 5,952,678 A * | 9/1999 | Ashida | |
| 5,956,112 A * | 9/1999 | Fujimori et al. | |
| 6,001,203 A * | 12/1999 | Yamada et al. | 156/106 |
| 6,011,609 A | 1/2000 | Kato et al. | |
| 6,016,178 A | 1/2000 | Kataoka et al. | |
| 6,016,181 A * | 1/2000 | Shimada | |

(Continued)

FOREIGN PATENT DOCUMENTS

EP  1 003 066 A1  5/2000

(Continued)

*Primary Examiner*—Ahshik Kim
(74) *Attorney, Agent, or Firm*—McKenna Long & Aldridge LLP

(57) ABSTRACT

A method for fabricating an LCD by liquid crystal dropping includes the steps of (a) loading a first substrate and a second substrate on a bonding chamber, (b) bonding the first and second substrates, (c) venting the bonding chamber for applying a pressure to the bonded first and second substrates, and (d) unloading the pressed first and second substrates.

25 Claims, 7 Drawing Sheets

U.S. PATENT DOCUMENTS

| | | | |
|---|---|---|---|
| 6,055,035 A | 4/2000 | von Gutfeld et al. | |
| 6,163,357 A | 12/2000 | Nakamura | |
| 6,219,126 B1 * | 4/2001 | von Gutfeld | |
| 6,226,067 B1 | 5/2001 | Nishiguchi et al. | |
| 6,236,445 B1 * | 5/2001 | Foschaar et al. | |
| 6,304,306 B1 | 10/2001 | Shiomi et al. | |
| 6,304,311 B1 * | 10/2001 | Egami et al. | 349/189 |
| 6,337,730 B1 * | 1/2002 | Ozaki et al. | |
| 6,414,733 B1 | 7/2002 | Ishikawa et al. | |
| 6,646,689 B2 * | 11/2003 | Matsuda | 349/1 |
| 6,650,393 B1 * | 11/2003 | Nishiguchi | 349/156 |
| 6,724,458 B2 * | 4/2004 | Kim et al. | 349/156 |
| 6,784,970 B2 * | 8/2004 | Lee et al. | 349/189 |
| 6,833,901 B2 * | 12/2004 | Lee et al. | 349/189 |
| 6,859,255 B2 * | 2/2005 | Liao et al. | 349/190 |
| 2001/0021000 A1 | 9/2001 | Egami | |
| 2002/0008838 A1 | 1/2002 | Matsuda | |
| 2002/0062787 A1 | 5/2002 | Hashizume et al. | |

FOREIGN PATENT DOCUMENTS

| | | |
|---|---|---|
| EP | 1003066 A1 | 5/2000 |
| JP | 2000-338501 | 12/0000 |
| JP | 51-65656 | 6/1976 |
| JP | 51-065656 | 6/1976 |
| JP | 57-038414 | 3/1982 |
| JP | 57038414 | 3/1982 |
| JP | 57-088428 | 6/1982 |
| JP | 57088428 | 6/1982 |
| JP | 58-027126 | 2/1983 |
| JP | 58027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60164723 | 8/1985 |
| JP | 60-217343 | 10/1985 |
| JP | 60217343 | 10/1985 |
| JP | 61-007822 | 1/1986 |
| JP | 61007822 | 1/1986 |
| JP | 61-055625 | 3/1986 |
| JP | 61055625 | 3/1986 |
| JP | S62-054225 | 3/1987 |
| JP | S62-054228 | 3/1987 |
| JP | 62-089025 | 4/1987 |
| JP | 62-090622 | 4/1987 |
| JP | 62089025 | 4/1987 |
| JP | 62090622 | 4/1987 |
| JP | 62-205319 | 9/1987 |
| JP | 62205319 | 9/1987 |
| JP | 63-109413 | 5/1988 |
| JP | 63-110425 | 5/1988 |
| JP | 63-128315 | 5/1988 |
| JP | 63109413 | 5/1988 |
| JP | 63110425 | 5/1988 |
| JP | 63128315 | 5/1988 |
| JP | 63-311233 | 12/1988 |
| JP | 63311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05-127179 | 5/1993 |
| JP | 05127179 | 5/1993 |
| JP | 05-154923 | 6/1993 |
| JP | 05-232481 | 9/1993 |
| JP | 05-265011 | 10/1993 |
| JP | 05-281557 | 10/1993 |
| JP | 05-281562 | 10/1993 |
| JP | 05265011 | 10/1993 |
| JP | 05281557 | 10/1993 |
| JP | 05281562 | 10/1993 |
| JP | H06-018829 | 1/1994 |
| JP | 06-051256 | 2/1994 |
| JP | 06051256 | 2/1994 |
| JP | H06-064229 | 3/1994 |
| JP | 06-148657 | 5/1994 |
| JP | 06148657 | 5/1994 |
| JP | 06-160871 | 6/1994 |
| JP | 6160871 | 6/1994 |
| JP | H06-194637 | 7/1994 |
| JP | 06-235925 | 8/1994 |
| JP | 06-265915 | 9/1994 |
| JP | 06265915 | 9/1994 |
| JP | 06-313870 | 11/1994 |
| JP | 07-084268 | 3/1995 |
| JP | 07-128674 | 5/1995 |
| JP | 07128674 | 5/1995 |
| JP | 07-181507 | 7/1995 |
| JP | 07181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 08-101395 | 4/1996 |
| JP | 08-106101 | 4/1996 |
| JP | 08095066 | 4/1996 |
| JP | 08106101 | 4/1996 |
| JP | H08-110504 | 4/1996 |
| JP | H08-136937 | 5/1996 |
| JP | 08-171094 | 7/1996 |
| JP | 08-190099 | 7/1996 |
| JP | 08171094 | 7/1996 |
| JP | 08190099 | 7/1996 |
| JP | H08-173874 | 7/1996 |
| JP | 08-240807 | 9/1996 |
| JP | 08240807 | 9/1996 |
| JP | 09-005762 | 1/1997 |
| JP | 09-026578 | 1/1997 |
| JP | 09005762 | 1/1997 |
| JP | 09026578 | 1/1997 |
| JP | H09-001026 | 1/1997 |
| JP | 09-311340 | 2/1997 |
| JP | 09-61829 | 3/1997 |
| JP | 09-061829 | 3/1997 |
| JP | 09-073075 | 3/1997 |
| JP | 09-073096 | 3/1997 |
| JP | 09073075 | 3/1997 |
| JP | 09073096 | 3/1997 |
| JP | H09-094500 | 4/1997 |
| JP | 09-127528 | 5/1997 |
| JP | 09127528 | 5/1997 |
| JP | 09-230357 | 9/1997 |
| JP | 09230357 | 9/1997 |
| JP | 09-281511 | 10/1997 |
| JP | 09281511 | 10/1997 |
| JP | 09311340 | 12/1997 |
| JP | 10-026763 | 1/1998 |
| JP | 10-123537 | 5/1998 |
| JP | 10-123538 | 5/1998 |
| JP | 10-142616 | 5/1998 |
| JP | 10123537 | 5/1998 |
| JP | 10123538 | 5/1998 |
| JP | 10142616 | 5/1998 |
| JP | 10-177178 | 6/1998 |
| JP | H10-174924 | 6/1998 |
| JP | 10-221700 | 8/1998 |
| JP | 10221700 | 8/1998 |

| | | | | | | |
|---|---|---|---|---|---|---|
| JP | 10-282512 | 10/1998 | | JP | 2001-222017 | 8/2001 |
| JP | 10282512 | 10/1998 | | JP | 2001-235758 | 8/2001 |
| JP | 10-333157 | 12/1998 | | JP | 2001-215459 | 9/2001 |
| JP | 10-333159 | 12/1998 | | JP | 2001-255542 | 9/2001 |
| JP | 11-014953 | 1/1999 | | JP | 2001-264782 | 9/2001 |
| JP | 11014953 | 1/1999 | | JP | 2001255542 | 9/2001 |
| JP | 11-038424 | 2/1999 | | JP | 2001264782 | 9/2001 |
| JP | 11038424 | 2/1999 | | JP | 2001-201750 | 10/2001 |
| JP | 11-064811 | 3/1999 | | JP | 2001-272640 | 10/2001 |
| JP | 11064811 | 3/1999 | | JP | 2001-281675 | 10/2001 |
| JP | 11-109388 | 4/1999 | | JP | 2001-281678 | 10/2001 |
| JP | 11109388 | 4/1999 | | JP | 2001-282126 | 10/2001 |
| JP | 11-133438 | 5/1999 | | JP | 2001-305563 | 10/2001 |
| JP | 11-142864 | 5/1999 | | JP | 2001-330837 | 11/2001 |
| JP | 11-174477 | 7/1999 | | JP | 2001-330840 | 11/2001 |
| JP | 11174477 | 7/1999 | | JP | 2001330840 | 11/2001 |
| JP | 11-212045 | 8/1999 | | JP | 2001-356353 | 12/2001 |
| JP | 11212045 | 8/1999 | | JP | 2001-356354 | 12/2001 |
| JP | 11-248930 | 9/1999 | | JP | 2001356354 | 12/2001 |
| JP | H11-262712 | 9/1999 | | JP | 2002-014360 | 1/2002 |
| JP | H11-264991 | 9/1999 | | JP | 2002-023176 | 1/2002 |
| JP | 11-326922 | 11/1999 | | JP | 2002014360 | 1/2002 |
| JP | 11-344714 | 12/1999 | | JP | 2002023176 | 1/2002 |
| JP | 11344714 | 12/1999 | | JP | 2002-049045 | 2/2002 |
| JP | 2000-002879 | 1/2000 | | JP | 2002049045 | 2/2002 |
| JP | 2000-029035 | 1/2000 | | JP | 2002-079160 | 3/2002 |
| JP | 2000029035 | 1/2000 | | JP | 2002-080321 | 3/2002 |
| JP | 2000-056311 | 2/2000 | | JP | 2002-082340 | 3/2002 |
| JP | 2000-066163 | 3/2000 | | JP | 2002-090759 | 3/2002 |
| JP | 2000-066165 | 3/2000 | | JP | 2002-090760 | 3/2002 |
| JP | 2000-066218 | 3/2000 | | JP | 2002082340 | 3/2002 |
| JP | 2000-093866 | 4/2000 | | JP | 2002090759 | 3/2002 |
| JP | 2000-137235 | 5/2000 | | JP | 2002090760 | 3/2002 |
| JP | 2000-147528 | 5/2000 | | JP | 2002-107740 | 4/2002 |
| JP | 3000-147528 | 5/2000 | | JP | 2002-122870 | 4/2002 |
| JP | 2000-193988 | 7/2000 | | JP | 2002-122872 | 4/2002 |
| JP | 2000-241824 | 9/2000 | | JP | 2002-122873 | 4/2002 |
| JP | 2000-284295 | 10/2000 | | JP | 2002107740 | 4/2002 |
| JP | 2000-292799 | 10/2000 | | JP | 2002122872 | 4/2002 |
| JP | 2000-310759 | 11/2000 | | JP | 2002122873 | 4/2002 |
| JP | 2000-310784 | 11/2000 | | JP | 2002-131762 | 5/2002 |
| JP | 2000-338501 | 12/2000 | | JP | 2002-139734 | 5/2002 |
| JP | 2001-005401 | 1/2001 | | JP | 2002-156518 | 5/2002 |
| JP | 2001-005405 | 1/2001 | | JP | 2002-169166 | 6/2002 |
| JP | 2001-013506 | 1/2001 | | JP | 2002-169167 | 6/2002 |
| JP | 2001-033793 | 2/2001 | | JP | 2002-182222 | 6/2002 |
| JP | 2001-042341 | 2/2001 | | JP | 2002080321 | 6/2002 |
| JP | 2001-051284 | 2/2001 | | JP | 2002-202512 | 7/2002 |
| JP | 2001-066615 | 3/2001 | | JP | 2002-202514 | 7/2002 |
| JP | 2001-091727 | 4/2001 | | JP | 2002-214626 | 7/2002 |
| JP | 2001-117105 | 4/2001 | | JP | 2002202512 | 7/2002 |
| JP | 2001-117109 | 4/2001 | | JP | 2002202514 | 7/2002 |
| JP | 2001117105 | 4/2001 | | JP | 2002214626 | 7/2002 |
| JP | 2001-133745 | 5/2001 | | JP | 2002-229042 | 8/2002 |
| JP | 2001-133794 | 5/2001 | | JP | 2002-229044 | 8/2002 |
| JP | 2001-133799 | 5/2001 | | JP | 2002-236276 | 8/2002 |
| JP | 2001-142074 | 5/2001 | | JP | 2002-258299 | 8/2002 |
| JP | 2001-147437 | 5/2001 | | JP | 2002-236292 | 9/2002 |
| JP | 2001133794 | 5/2001 | | JP | 2002-277865 | 9/2002 |
| JP | 2001142074 | 5/2001 | | JP | 2002-277866 | 9/2002 |
| JP | 2001147437 | 5/2001 | | JP | 2002-277881 | 9/2002 |
| JP | 2001-154211 | 6/2001 | | JP | 2002-287156 | 10/2002 |
| JP | 2001-166272 | 6/2001 | | JP | 2002-296605 | 10/2002 |
| JP | 2001-166310 | 6/2001 | | JP | 2002-311438 | 10/2002 |
| JP | 2001154211 | 6/2001 | | JP | 2002-311440 | 10/2002 |
| JP | 2001-183683 | 7/2001 | | JP | 2002-311442 | 10/2002 |
| JP | 2001-201750 | 7/2001 | | JP | 2002-323687 | 11/2002 |
| JP | 2001-209052 | 8/2001 | | JP | 2002-323694 | 11/2002 |
| JP | 2001-209056 | 8/2001 | | JP | 2002-333628 | 11/2002 |
| JP | 2001-209057 | 8/2001 | | JP | 2002-333635 | 11/2002 |
| JP | 2001-209058 | 8/2001 | | JP | 2002-333843 | 11/2002 |
| JP | 2001-209060 | 8/2001 | | JP | 2002-341329 | 11/2002 |
| JP | 2001-215459 | 8/2001 | | JP | 2002-341355 | 11/2002 |

| | | | | | |
|---|---|---|---|---|---|
| JP | 2002-341356 | 11/2002 | KR | 2000-0035302 | 6/2000 |
| JP | 2002-341357 | 11/2002 | KR | 2000-0035302 A1 | 6/2000 |
| JP | 2002-341358 | 11/2002 | | | |
| JP | 2002-341359 | 11/2002 | | | |
| JP | 2002-341362 | 11/2002 | | | |

* cited by examiner

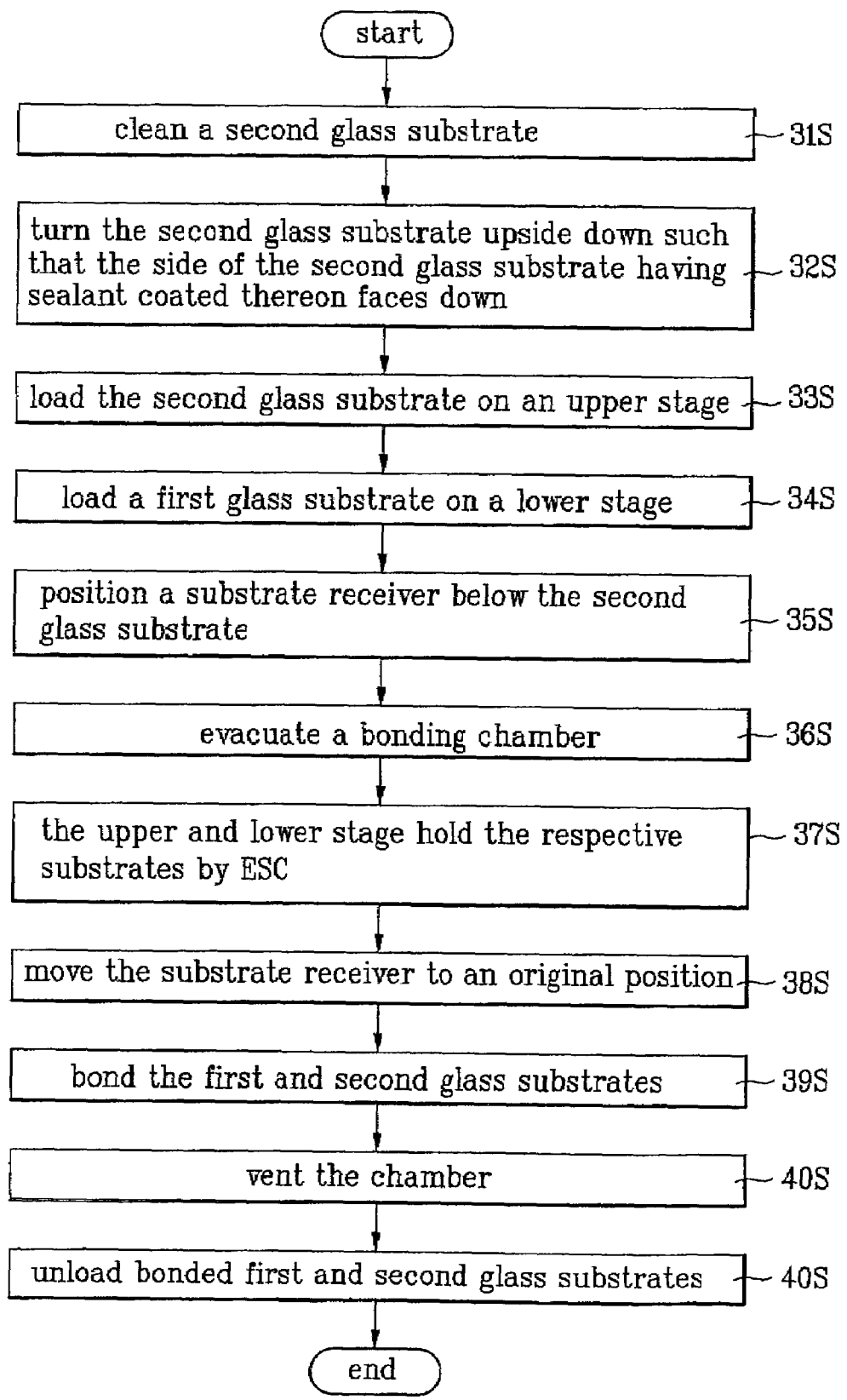

METHOD FOR FABRICATING LCD

This application claims the benefit of the Korean Application Nos. P2002-8319 filed on Feb. 16, 2002, and P2002-8424 filed on Feb. 18, 2002, which are hereby incorporated by reference.

This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to a liquid crystal display, and more particularly, to a method for fabricating an LCD having a liquid crystal dropping method applied thereto.

2. Discussion of the Related Art

In general, recent developments in the information communication field have increased demand for various types of display devices. In response to this demand, various flat panel displays such as liquid crystal display (LCD), plasma display panel (PDP), electro luminescent display (ELD), and vacuum fluorescent display (VFD) have been developed, some of which have been employed as displays in various products.

The LCDs have been used most widely as mobile displays while the LCD replaces the CRT (Cathode Ray Tube) because of features and advantages including excellent picture quality, light weight, thin profile, and low power consumption. In addition to the mobile type LCDs, such as a display for notebook computer, LCDs have been developed for computer monitors and televisions to receive and display broadcasting signals.

Despite various technical developments in the LCD technology with applications in different fields, research in enhancing the picture quality of the LCD as a display has been in some respects lacking as compared to the features and advantages of the LCD. Therefore, to use the LCD in various fields as a general display, the key to developing the LCD lies on whether the LCD can implement a high quality picture, such as high resolution, high luminance, and large sized screen while still maintaining light weight, thin profile, and low power consumption.

The LCD is provided with a liquid crystal panel for displaying a picture, and a driving part for providing a driving signal to the liquid crystal panel. The liquid crystal panel has first and second glass substrates bonded together with a gap between the substrates. A liquid crystal layer is formed by injecting liquid crystal between the first and second glass substrates.

On the first glass substrate (a TFT array substrate, for example), there are a plurality of gate lines arranged in a first direction at fixed intervals, a plurality of data lines arranged in a second direction perpendicular to the gate lines at fixed intervals, a plurality of pixel electrodes in respective pixel regions defined by the gate lines and the data lines in a matrix, and a plurality of thin film transistors switchable in response to a signal from the gate lines for transmission of a signal from the data line to the pixel electrodes.

The second glass substrate (a color filter substrate) has a black matrix layer for shielding light from areas excluding the pixel regions, red (R), green (G), blue (B) color filter layers, and a common electrode for implementing a picture.

The foregoing first and second substrates have a gap between them which is maintained by spacers, and bonded by a sealant. The seal has a liquid crystal injection inlet through which liquid crystal is injected after the two substrates are bonded and sealed.

After the individual liquid crystal panels are cut, the space between the two bonded substrates of each LCD panel is evacuated and the liquid crystal injection inlet is dipped in a liquid crystal bath, so that the liquid crystal is injected into the space by a capillary tube phenomenon. Once the liquid crystal is injected into the space between the two substrates the liquid crystal injection inlet is sealed by a sealant.

However, the related art method for fabricating an LCD having liquid crystal injected therein has the following problems. First, the related art method has poor productivity because the dipping of the liquid crystal in a liquid crystal bath while the space between the two substrates are maintained at a vacuum and the unit panels are cut into individual pieces for injection of the liquid crystal takes much time. Second, the liquid crystal injection, for a large LCD in particular, may cause imperfect filling of the liquid crystal in the panel, which may result in a defective panel. Third, the complicated and lengthy fabrication process requires the use of many liquid crystal injection devices, which occupies a large portion of space.

Accordingly, a method for fabricating an LCD by using a liquid crystal dropping method has been under research recently. Japanese Patent Application Nos. H11-089612, and H11-172903, and Japanese Laid-Open Patent Publication No. 2000-147528 disclose the following liquid crystal dropping method.

A related art method for fabricating an LCD having the foregoing liquid crystal dropping method applied thereto will be explained. FIGS. 1A–1F illustrate steps of a related art method for fabricating an LCD.

Referring to FIG. 1A, UV seal 1 is coated on a first glass substrate 3 having a thin film transistor array formed thereon to a thickness of approximately 30 µm, and liquid crystal 2 is dropped on an interior of the seal 1 which is the thin film transistor array part. No liquid crystal injection opening is provided in the seal 3.

The first glass substrate 3 is mounted on a table 4 in a vacuum container 'C' which is movable in a horizontal direction, and held by a plurality of first vacuum holes 5 on the entire bottom surface of the first glass substrate 3.

Referring to FIG. 1B, the bottom surface of the second glass substrate 6 having a color filter array formed thereon is held by vacuum using a second plurality of vacuum holes 7. The vacuum container 'C' is closed and evacuated. The second glass substrate 7 is moved downward in a vertical direction until a gap between the first glass substrate 3 and second glass substrate 6 is 1 mm. The table 4 supporting the first glass substrate 3 thereon is moved in a horizontal direction, to align the first and second glass substrates 3 and 6.

Referring to FIG. 1C, the second glass substrate 6 is moved downward until the second glass substrate 6 comes into contact with the liquid crystal 2 or the sealant 1. Referring to FIG. 1D, the table 4 with the first glass substrate 3 thereon is moved in a horizontal direction to align the first and second glass substrates 3 and 6. Referring to FIG. 1E, the second glass substrate 6 is moved further down until the gap between the second glass substrate 6 and the first glass substrate 3 becomes 5 µm.

Referring to FIG. 1F, the pre-bonded first and second glass substrates 3 and 6 are taken out of the vacuum container 'C', and a UV ray is directed to the sealant, to set the sealant 1, thereby completing the fabrication process.

However, the foregoing related art method for fabricating an LCD having the liquid crystal dropping method applied thereto has the following problems.

First, coating the sealant and dropping the liquid crystal on the same substrate requires much fabrication time before the two substrates can be bonded to each other.

Second, as the seal is coated and the liquid crystal is dropped on the first substrate while the second substrate sits idle, there is an unbalance of a fabrication process between the first and second substrates, resulting in an ineffective operation of the production line.

Third, because the seal is coated and the liquid crystal is dropped on the first substrate, the first substrate with a coat of the sealant applied thereto can not be subjected to cleaning by a USC. Therefore, as the sealant that will bond the two substrates should not be removed, undesirable particles also cannot be removed, which may cause defective contact of the sealant in the bonding.

Fourth, since the bonding of the two substrates is done by the table and the second plurality of vacuum holes, there is a possibility of defective bonding caused by nonuniform application of pressure throughout the substrate when the levels of the table and the second plurality of vacuum holes are not accurate.

Fifth, the introduction of air into the vacuum container when the vacuum container is pressurized to the atmospheric pressure may deteriorate the integrity of the vacuum container due to moisture contained within the air.

SUMMARY OF THE INVENTION

Accordingly, the present invention is directed to a method for fabricating a liquid crystal display that substantially obviates one or more of the problems due to limitations and disadvantages of the related art.

An advantage of the present invention is to provide a method for fabricating an LCD having the liquid crystal dropping method applied thereto, which can shorten a fabrication time and apply uniform pressure to substrates, to improve productivity.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a method for fabricating an LCD includes the steps of: (a) loading a first substrate and a second substrate into a bonding chamber; (b) bonding the first and second substrates; (c) venting the bonding chamber to apply pressure to the bonded first and second substrates; and (d) unloading the pressed first and second substrates.

In one aspect of the present invention, step (a) includes steps of affixing the first and second substrates to lower and upper stages, respectively, provided in the bonding chamber, placing a substrate receiver provided in the bonding chamber under the second substrate held to the upper stage, and using an ESC to fasten the first and second substrates to their respective stages.

In one aspect of the present invention, step (b) includes the step of varying a pressure within the bonding chamber at least twice.

In one aspect of the present invention, step (c) includes the steps of moving the upper stage to a final raised position and then injecting gas or clean dry air into the bonding chamber. In another aspect of the present invention, step (c) alternately includes the steps of injecting gas or clean dry air into the bonding chamber after the upper stage in the bonding machine begins moving to the final raised position but before the upper stage reaches the final raised position. In yet another aspect of the present invention, step (c) alternately includes the steps of injecting gas or clean dry air into the bonding chamber prior to moving the upper stage toward the final raised position. In yet another aspect of the present invention, step (c) includes the step of injecting the gas or clean dry air into the bonding chamber in two steps.

In one aspect of the present invention, the step for moving up the upper stage in the bonding machine includes a step of blowing gas or clean dry air through vacuum channels formed in the upper stage. In another aspect of the present invention, the gas (e.g., $N_2$, etc.) or clean dry air may be injected into the bonding chamber from a top or bottom part of the bonding chamber.

In one aspect of the present invention, step (c) includes the step of venting at the atmospheric pressure or at a pressure of 0.43–3.0 $Kg/cm^2$.

Preferably, the method for fabricating an LCD further includes the step of fixing the bonded substrates to the lower stage in the chamber before venting the bonding chamber.

In one aspect of the present invention, step (d) includes the steps of loading at least one of the first or second unbonded substrates onto the upper or the lower stage of the bonding chamber while unloading bonded substrates.

In a further aspect of the present invention, the method for fabricating an LCD further includes, prior to step (a), providing liquid crystal material to the first substrate only and flipping the second substrate upside down. In one aspect of the present invention, the step of flipping the second substrate upside down includes the steps of loading the second substrate onto a table of a turner, making a pre-alignment structure, securely attaching the second substrate to the table, rotating the table upside down, and carrying the turned second substrate to the bonding chamber. In one aspect of the present invention, the second substrate is cleaned before it is flipped upside down.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention:

In the drawings:

FIG. 3 illustrates the steps of bonding in accordance with an embodiment of the present invention.

DETAILED DESCRIPTION OF THE ILLUSTRATED EMBODIMENTS

Reference will now be made in detail to the preferred embodiments of the present invention, examples of which are illustrated in the accompanying drawings.

FIGS. 2A–2G schematically illustrate the steps of a method for fabricating an LCD in accordance with an embodiment of the present invention.

Figure 1A:
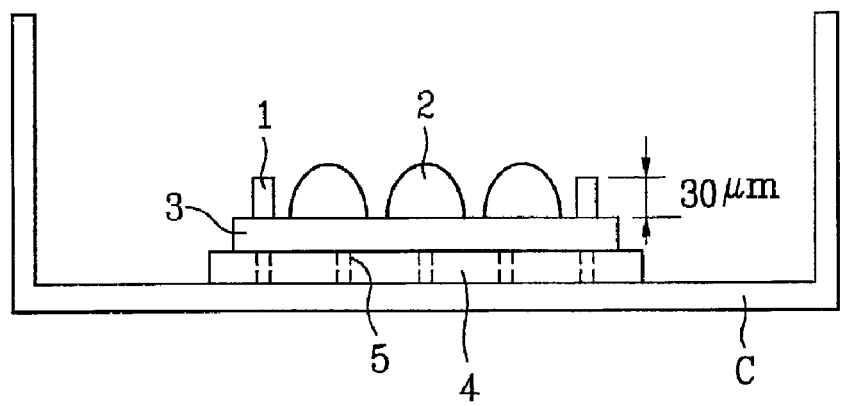
FIGS. 1A–1F schematically illustrate the steps of a related art method for fabricating an LCD having a liquid crystal dropping method applied thereto.
Figure 1B:
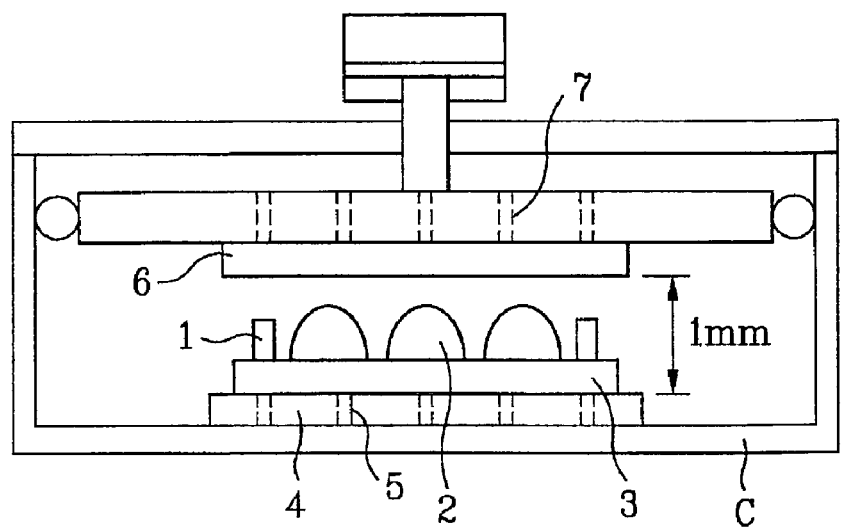
Figure 1C:
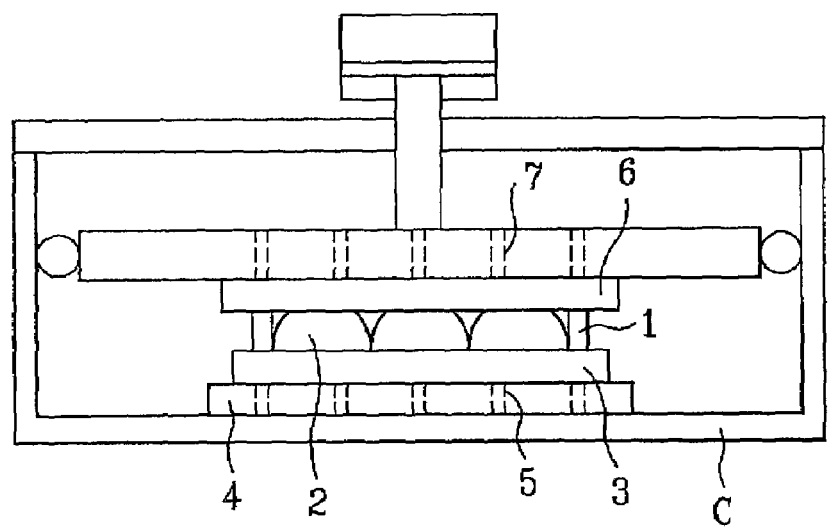
Figure 1D:
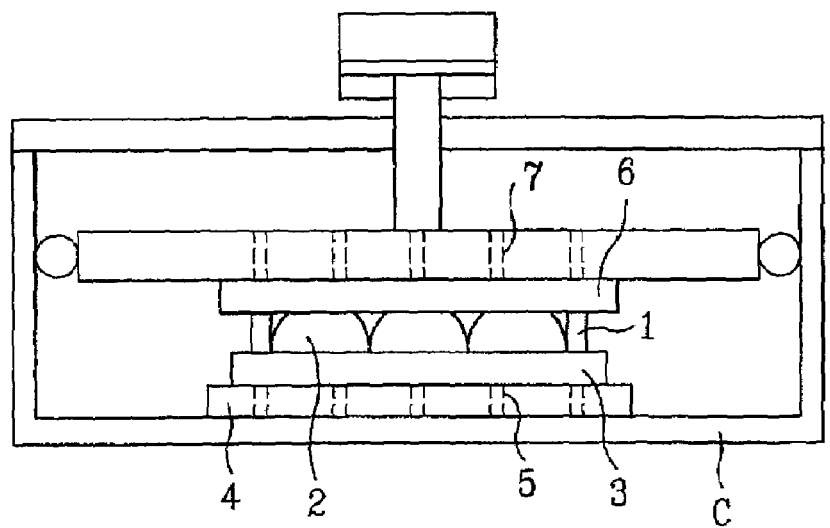
Figure 1E:
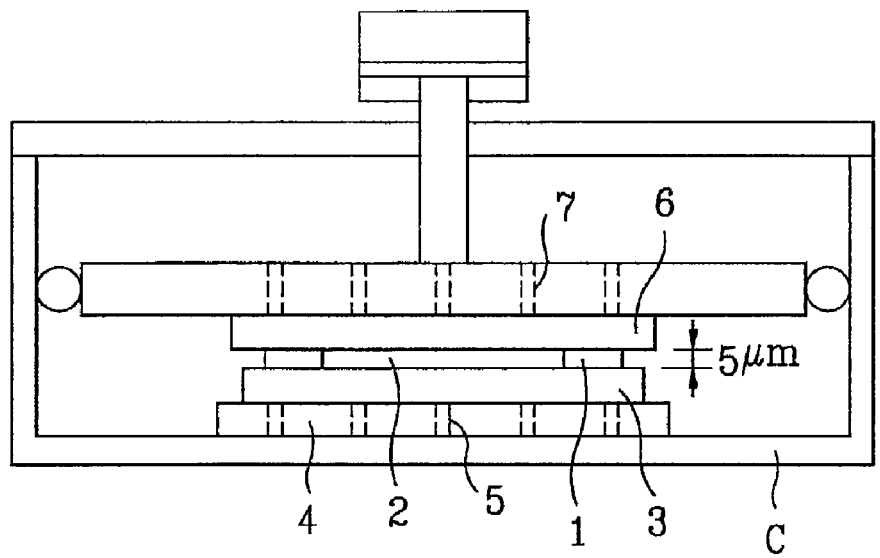
Figure 1F:
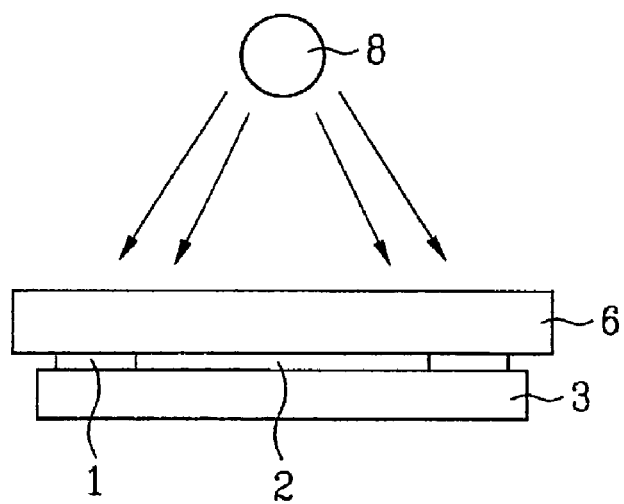
Figure 2A:
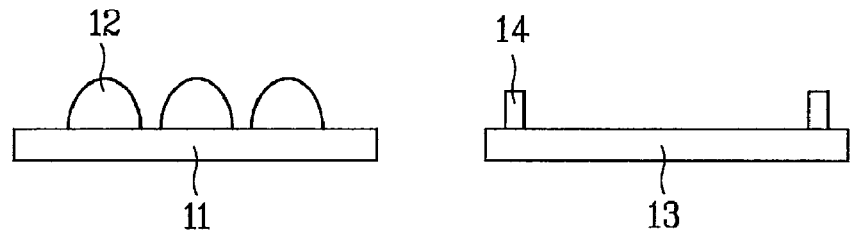
FIGS. 2A–2G schematically illustrate the steps of a method for fabricating an LCD having a liquid crystal applied thereto in accordance with an embodiment of the present invention.

Referring to FIG. 2A, liquid crystal 12 may be applied to a first glass substrate 11, and seal 14 may be coated on a second substrate 13. A plurality of corresponding areas designated for panels may be provided in first and second glass substrates 11 and 13, and thin film transistor arrays may be formed on each of the panels within the first glass substrate 11 while color filter arrays, black matrix layers, a color filter layers, common electrodes, etc., may be formed on each of the panels of the second glass substrate 13. Liquid crystal material 12 may be applied onto the first glass substrate 11 and a seal 14 may be coated onto the second glass substrate 13. Alternatively, the seal 14 may be coated on the first glass substrate 11 and the liquid crystal material 12 may be dropped on the second glass substrate 13 or both the liquid crystal material 12 and the seal 14 may be dropped and coated on either of the two glass substrates. In any case, however, when placed into the vacuum bonding chamber to be bonded with another substrate, the glass substrate having the liquid crystal dropped thereon must be placed on a lower stage, as will be discussed in greater detail below.

With reference to FIG. 3, the bonding process will be explained in more detail.

FIG. 3 illustrates a flow chart showing the steps of bonding of the present invention. Generally, the bonding process includes a step of loading the two substrates into a vacuum bonding chamber, bonding the two substrates, venting the vacuum bonding chamber to apply a pressure to the bonded substrates, and unloading the bonded substrates from the vacuum bonding chamber.

Before loading the first and second substrates 11 and 13 into the vacuum bonding chamber, a seal is formed on the second glass substrate 13. Subsequently, particles formed during various fabrication processes are removed from the second glass substrate in a USC (Ultra Sonic Cleaner). Since no liquid crystal applied onto the second glass substrate 13, coated by the seal, the second glass substrate 13 can be cleaned.

Figure 2B:
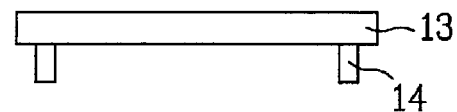

Referring to FIG. 2B, since both a part of the first glass substrate 11 having the liquid crystal dropped thereon and a part of the second glass substrate 13 having the seal 14 coated thereon face upward, it is required that one of the two substrates is turned upside down, for bonding the two substrates 11 and 13. However, the first glass substrate 11 cannot be turned upside down, the second glass substrate 13 having the seal coated thereon is turned upside down such that the part of the second glass substrate the seal 14 coated thereon faces down (32S).

The second glass substrate 13 is turned upside down by loading the second substrate onto a table of a turner then pre-aligning and securing the second substrate. Next, the table is turned upside down, and the turned substrate is carried to the vacuum bonding chamber.

Figure 2C:
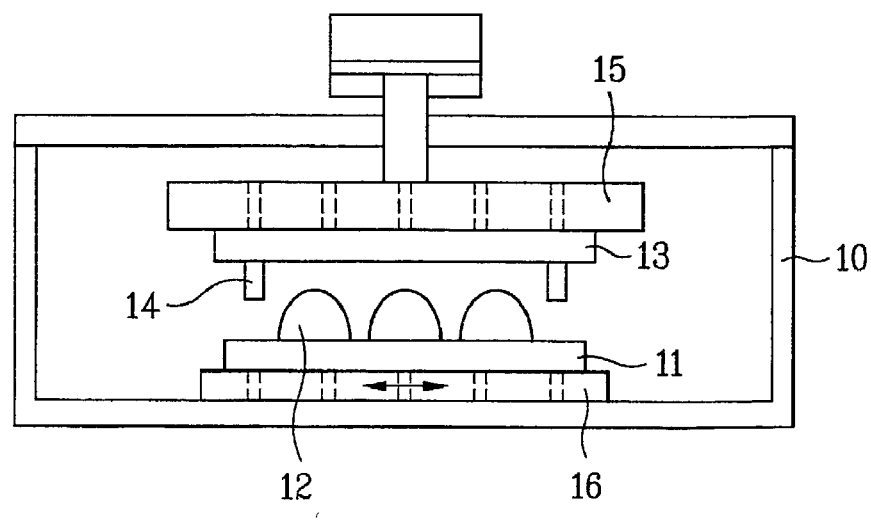

Referring generally to FIG. 2C, in the loading step, the second glass substrate 13 is held to an upper stage 15 in the vacuum bonding chamber 10, wherein the seal 14 faces down (33S), and the first glass substrate 11 is held to a lower stage 16 in the vacuum bonding chamber 10 (34S), wherein the liquid crystal material 12 faces up. The vacuum bonding chamber 10 is hereby in a standby state.

More specifically, the second glass substrate 13 with the seal 14 facing down is held by a loader of a robot (not shown), and is brought into the vacuum bonding chamber 10. The upper stage 15 in the vacuum bonding chamber 10 is moved down to meet and hold the second glass substrate 13, and is then moved back up. The second glass substrate 13 may be held to the upper stage 15 with the use of a vacuum force or with an electrostatic force.

Then, the loader is moved out of the vacuum bonding chamber 10 and places the first glass substrate 11 over the lower stage 16 in the vacuum bonding chamber 10.

Next, the second glass substrate 13 is placed on a substrate receiver (not shown) by placing the substrate receiver under the second glass substrate 13 and moving the upper stage down, or the substrate receiver up, or both, until the second glass substrate 13 contacts the substrate receiver (35S). After the second glass substrate 13 and the substrate receiver are brought into contact the second glass substrate 13 is held to the upper stage.

The substrate receiver contacts an under side of the second glass substrate 13, to prevent the second glass substrate held to the upper stage from becoming detached from the upper stage due to a reduction in a vacuum force present within the upper stage when a vacuum in the bonding chamber becomes higher than the vacuum force within the upper and lower stages.

Accordingly, the second glass substrate 13, held to the upper stage, may be placed on the substrate receiver before or during the creation of a vacuum in the vacuum bonding chamber. Alternatively, the upper stage holding the second glass substrate and the substrate receiver may be brought to within a predetermined distance of each other so that the second glass substrate 13 may be safely placed on the substrate receiver from the upper stage when the chamber is evacuated. Moreover, means for securing the substrates may be provided additionally as air flow in the chamber, capable of shaking the substrates, may occur when evacuation of the vacuum bonding chamber is initiated.

The vacuum bonding chamber 10 is evacuated (36S). The vacuum within the vacuum bonding chamber 10 may have a pressure in a range of about $1.1 \times 10^{-3}$ Pa to about 1 Pa for IPS mode LCDs, and about $1.1 \times 10^{-3}$ Pa to about $10^2$ Pa for TN mode LCDs.

Evacuation of the vacuum bonding chamber 10 may be carried out in two stages. After the substrates are held to their respective stages, a chamber door is closed and the vacuum chamber is evacuated a first time. After positioning the substrate receiver under the upper stage and placing the substrate on the substrate receiver or after positioning the upper stage and the substrate receiver to within the predetermined distance when the upper stage biases the substrate, the vacuum bonding chamber is evacuated for a second time. The second evacuation is faster than the first evacuation. The vacuum force created by the first evacuation is not higher than the vacuum force within the upper stage.

The aforementioned two stage evacuation process may prevent deformation or shaking of the substrates in the vacuum bonding chamber that conventionally occurs when the vacuum bonding chamber is rapidly evacuated.

Alternatively, evacuation of the bonding chamber may be carried out in a single stage. Accordingly, after the substrates are held to their respective stages and the chamber door is closed, the evacuation may be started and the substrate receiver may be brought to the underside of the upper stage during the evacuation. The substrate receiver must be brought to the underside of the upper stage before the vacuum force within the vacuum bonding chamber becomes higher than the vacuum force within the upper stage.

Once the vacuum bonding chamber 10 is evacuated to a preset vacuum, the upper and lower stages 15 and 16 bias and fix the first and second glass substrates 11 and 13 respectively using an ESC (Electro Static Charge) (37S) and the substrate receiver is brought to its original position (38S) out from under the upper plate.

Using ESC the first and second glass substrates may be held to their respective stages by applying negative/positive DC voltages to two or more plate electrodes (not shown) formed within the stages. When the negative/positive voltages are applied to the plate electrodes, a coulombic force is generated between a conductive layer (e.g., transparent electrodes, common electrodes, pixel electrodes, etc.) formed on the substrate and the stage. When conductive layer formed on the substrate faces the stage, about 0.1–1 KV is applied to the plate electrodes. When the substrate contains no conductive layer, about 3–4 KV is applied to the plate electrodes. An elastic sheet may be optionally be provided to the upper stage.

Figure 2D:
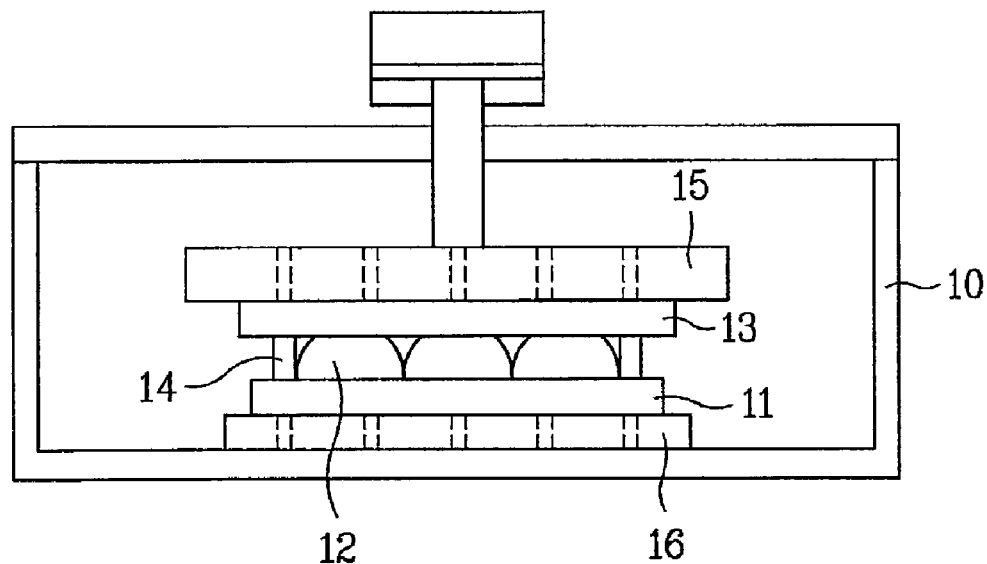
Figure 2E:
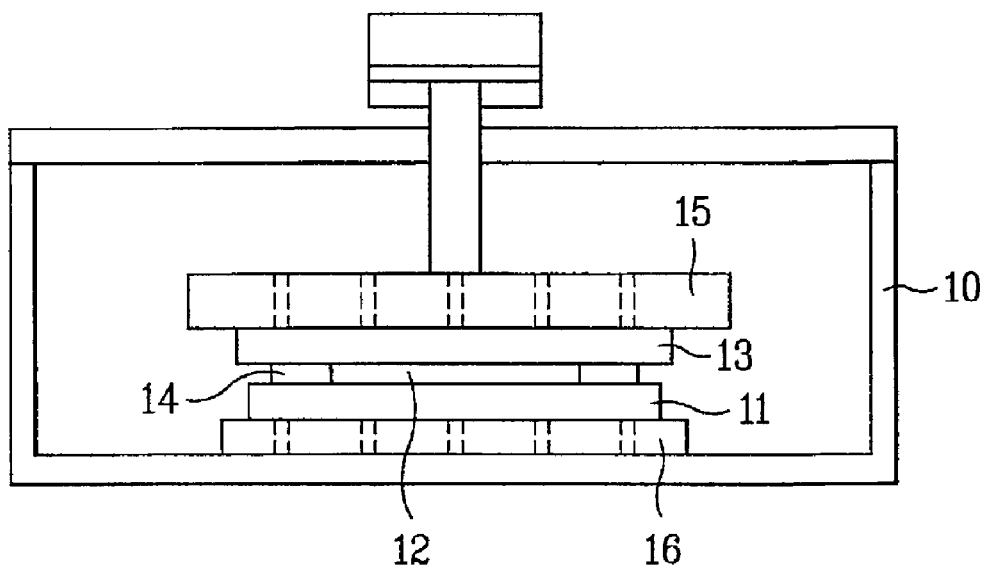

Referring to FIGS. 2D and 2E, after the two glass substrates 11 and 13 are aligned and held to their respective stages by ESC, the two stages are moved into proximity such that the two glass substrates may be bonded together (a first pressure application 39S). The first and second glass substrates 11 and 13 are pressed together by moving either the upper stage 15 or the lower stage 16 in a vertical direction, while varying speeds and pressures at different stage locations. Until the time the liquid crystal 12 on the first glass substrate 11 and the second glass substrate 13 come into contact, or until the time the first glass substrate 11 and the seal on the second glass substrate 13 come into contact, the stages are moved at a fix speed or fixed pressure, and the pressure is boosted up step by step from the time of contact to a final pressure. That is, the time of contact may be sensed by a load cell fitted to a shaft of the movable stage. The two glass substrates 11 and 13 may, for example, be pressed at a pressure of 0.1 ton at the time of contact, a pressure of 0.3 ton at an intermediate time period, a pressure of 0.4 ton at a full contact stage, and a pressure of 0.5 ton at a final stage (see FIG. 2E).

Though it is illustrated that the upper stage presses down onto the substrate by means of one shaft, a plurality of shafts may independently apply and control pressure using an individual load cell. If the lower stage and the upper stage are not leveled or fail to be pressed uniformly, predetermined shafts may be selectively pressed using lower or higher pressures to provide uniform bonding of the seal.

Figure 2F:
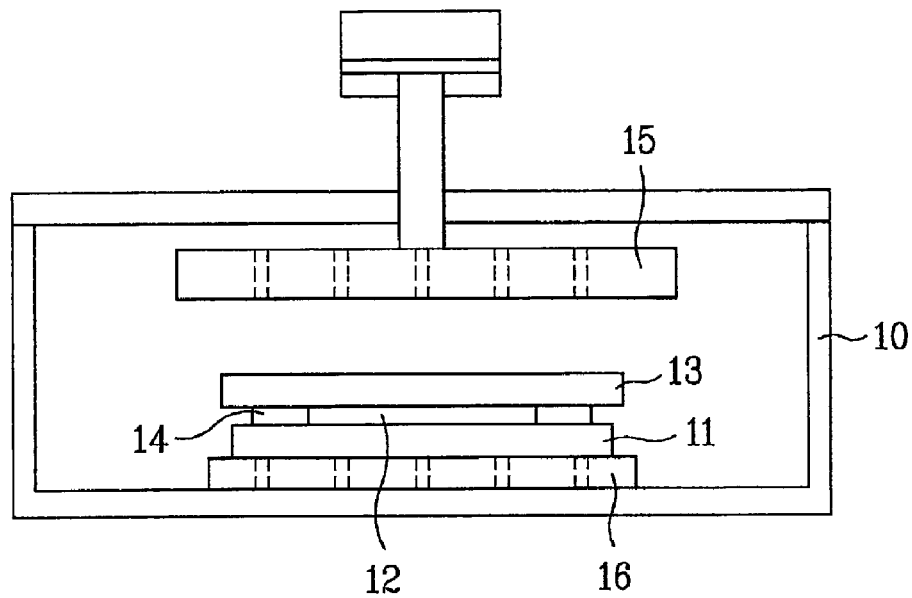

Referring to FIG. 2F, after the two substrates have been bonded, the ESC is turned off and the upper stage 15 is moved up to separate the upper stage 15 from the bonded two glass substrates 11 and 13.

Figure 2G:
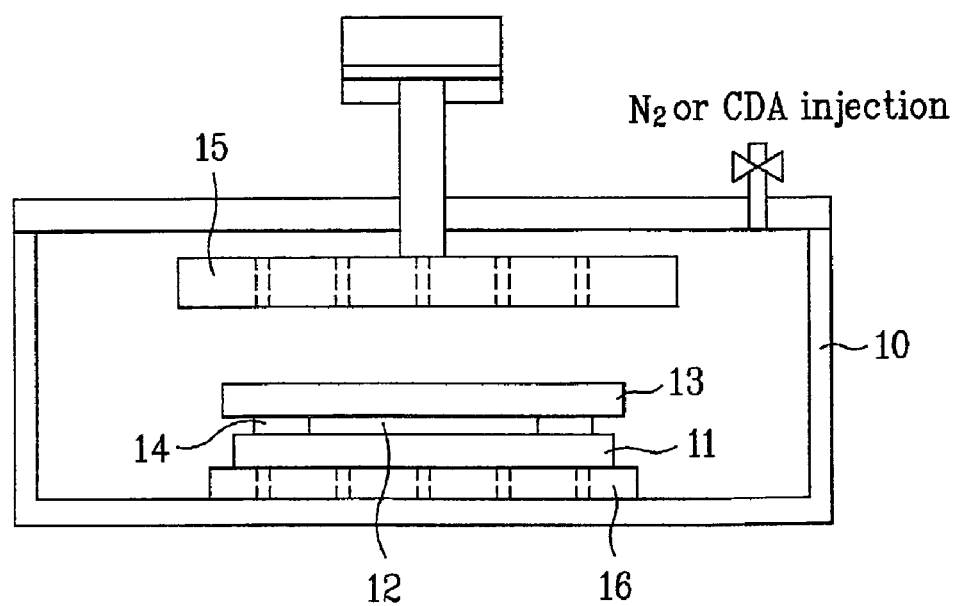

Referring to FIG. 2G, a gas, such as $N^2$, or clean dry air is subsequently introduced into the bonding chamber 10, to vent the vacuum bonding chamber (40S). Venting the vacuum bonding chamber 10 returns the pressure within the chamber from a vacuum state to an atmospheric state providing uniform pressure application to the bonded substrates.

Thus upon venting the vacuum chamber, a vacuum is created in the space between the first and the second glass substrates newly bonded by the seal 14 and atmospheric pressure within the chamber provided after venting presses the space between the first and second glass substrates 11 and 13 in the vacuum state is pressed uniformly. Accordingly, an even gap is maintained. It should be noted, however, that the bonded substrates 11 and 13 are pressed not only by the ambient pressure of the venting gas within the chamber after venting is complete, but also by the venting gas as it is introduced during the venting process.

Uniform application of a pressure to every part of the substrate is required for formation of a seal having a fixed height between the two substrates and uniform distribution of the liquid crystal to thereby prevent breakage of the seal or imperfect filling of the liquid crystal. To ensure uniform pressure application to the substrate while the chamber is vented, the direction a gas is being vented may be monitored and controlled.

A plurality of gas injection tubes may be provided within top, bottom, and side portions of the chamber. The plurality of gas injection tubes within the top, bottom, and side portions of the chamber are capable of injecting gas into the chamber. In one aspect of the invention, the gas may be injected into the chamber from the top. Further, the venting direction of the gas may be determined based on the size of the substrate and the position of the stages within the chamber. In one aspect of the present invention, depending on the size of the substrates being bonded and the size of the chamber, the number of gas injection tubes within any portion of the chamber may be at least 2 (e.g., 8)

As mentioned above, the two substrates 11 and 13 are pressed, not only by the atmospheric pressure, but also by a pressure caused by injection of the venting gas. Though the pressure applied to the two substrates are atmospheric $10^5$ Pa, a pressure ranging 0.4–3.0 Kg/cm2 is appropriate, and a pressure at 1.0 Kg/cm$^2$ is preferable.

Since a rapid venting of the chamber may cause shaking of the substrate, that causes misalignment of the bonded substrates, fastening means for preventing the substrates from shaking, may also be provided. Alternately, shaking may be prevented by venting the chamber in a series of progressive steps. Further, a slow valve may also be provided to slow venting of the gas into the chamber.

Venting of the chamber may be started and finished in a single venting step. Alternatively, venting of the chamber may be started slowly at a first rate, to prevent the substrate from shaking, and after a preset time is reached, the venting of the chamber may be carried out at a second rate, higher than the first rate, to quickly reach atmospheric pressure.

Because the bonded substrates on the stage may be shaken or misaligned while the chamber is venting, the amount of time required to inject the gas into the chamber may be monitored and controlled. For purposes of discussion, the venting time is initiated when the space between the two substrates exists in a vacuum, as alignment is complete, and the pressure within the chamber is progressed for the first time. A venting method will now be explained in greater detail.

Generally, in one aspect of the present invention, venting may be started at the same time the upper stage begins its ascent to its final raised position. Venting may be alternatively be started after the substrates have been bonded but prior to any movement of any of the stages. In another aspect of the present invention, the upper stage may be moved either before or after the venting of the chamber is finished.

In one aspect of the present invention, the chamber may be pressurized by a venting process. Accordingly venting of the chamber may be started after the upper stage is moved up to its final raised position. Alternatively, the upper stage may be raised to a predetermined distance to prevent any lifting of the substrates upon initiation of the venting. In another aspect of the present invention, the fabrication time for the LCD may be reduced by starting the venting process before the upper stage is moved up to its final raised position but after the upper stage begins its ascent.

In another aspect of the invention, the chamber may be pressurized by a venting process wherein gas (e.g., $N_2$, etc.) or clean dry air is also blown through vacuum channels formed in the upper stage. The additional gas or clean dry air may be blown because the upper stage may not be easily separated from the bonded substrates leading to the possibility that the substrates may be shaken and/or fall below the upper stage.

Accordingly, in the present aspect, the venting may be started, then gas or clean dry air may be blown through the upper stage, and then the upper stage may be raised to is final position. Alternately, after the venting begins the gas or the clean dry air may be blown simultaneously with the raising of the upper stage. Alternately still, the venting may begin simultaneously with the blowing of the gas or clean dry air through the upper stage, followed by the raising of the upper stage. In another alternative, the venting, blowing, and raising of the upper stage may occur simultaneously. The gas or clean dry air may alternately be blown through the upper stage, followed by the raising of the upper stage, and followed still by the venting of the chamber via the gas injection tubes. Lastly, the gas or clean dry air may alternately be blown through the upper stage, followed by the venting of the chamber, and then followed by the raising of the upper stage.

After venting is finished and the upper stage is completely raised, the bonded substrates are unloaded (41S). That is, upon completion of the venting, the upper stage 15 is moved up to its final raised position and the bonded first and second glass substrates 11 and 13 are unloaded using the loader. Alternatively, the bonded first and second glass substrates 11 and 13 may be held to the upper stage 15 and moved up where the loader then unloads the first and second glass substrates 11 and 13 from the raised upper stage 16.

In order to shorten the fabrication time for the LCD, one of the first and second glass substrates to be bonded in a next bonding process may be loaded onto an empty stage while the fixed first and second glass substrates are unloaded. For example, after the second glass substrate 13 to be bonded in a next bonding process is brought to the upper stage 15 via the loader and held to the upper stage, the fixed first and second glass substrates on the lower stage 16 may be unloaded. Alternatively, after the upper stage 15 lifts the fixed first and second glass substrates 11 and 13, the loader may load a first glass substrate 11 to be bonded in a next bonding process onto the lower stage, and the fixed first and second glass substrates may be unloaded.

A liquid crystal spreading process may optionally be added before the process of unloading the bonded substrates where the liquid crystal between the fixed substrates may be spread, for example, toward the seal. Alternatively, a liquid crystal spreading process may be carried out to evenly spread the liquid crystal toward the seal when the liquid crystal does not adequately spread after the unloading. The liquid crystal spreading process may be carried out for more than 10 min. under atmospheric pressure or in a vacuum.

As has been explained, the method for fabricating an LCD according to the present invention has the following advantages.

First, applying the liquid crystal on the first substrate and coating the seal on the second substrate shorten a fabrication time prior to bonding the two substrates together.

Second, applying the liquid crystal on the first substrate and coating the seal on the second substrate permits a balanced progression of the fabrication processes to the first and second substrates, thereby making efficient use of a production line.

Third, applying the liquid crystal on the first substrate and coating the seal and Ag dots on the second substrate minimizes contamination of the seal from particles because the substrate having the seal coated thereon may be cleaned just prior to bonding.

Fourth, positioning the substrate receiver under the substrate and evacuation of the vacuum bonding chamber permits the substrate affixed to the upper stage from falling down and breaking.

Fifth, sensing the time during which the two substrates come into contact and the varying the pressure in bonding the two substrates minimizes damage made by the liquid crystal to the orientation film.

Sixth, since the upper stage presses the substrate down by means of a plurality of shafts, each of which capable of applying pressure independently, uniform bonding of the seal can be achieved by independently applying a lower or higher pressures by predetermined shafts when the lower stage and the upper stage are not level or fail to bond to the seal uniformly.

Seventh, the two staged evacuation of the vacuum bonding chamber prevents deformation of the substrate and air flow in the chamber caused by a sudden vacuum.

Eighth, the application of pressure to the bonded substrates, bonded in a vacuum, by venting the bonding chamber to atmospheric pressure permits a uniform application of pressure to the bonded substrates.

Ninth, performing venting in two steps minimizes damage to the substrates.

Tenth, simultaneous loading and unloading of glass substrates shortens fabrication times.

Eleventh, inclusion of a liquid crystal spreading process shortens the LCD fabrication time.

Twelfth, the simultaneous venting and separation of the upper stage from the substrates reduces a venting time period.

It will be apparent to those skilled in the art that various modifications and variations can be made in the method for fabricating an LCD of the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display (LCD) comprising:

loading a first substrate and a second substrate into a bonding chamber;

pressing the first and second substrates, thereby bonding the first and second substrates, wherein the pressing includes pressing the first and second substrates together using at least two pressures;

venting the bonding chamber at the atmospheric pressure for applying a pressure to the bonded first and second substrates; and after the venting, unloading the bonded first and second substrates, wherein the loading includes:

holding the first and second substrates to upper and lower stages in the bonding chamber, respectively;

placing a substrate receiver of a bonding machine under the second substrate held to the upper stage; and holding the first and second substrates at the stages by an electro static charge (ESC).

2. A method as claimed in claim 1, wherein the venting includes:
moving an upper stage of the bonding chamber to a final raised position; and
injecting gas or clean dry air into the bonding chamber.

3. A method as claimed in claim 1, wherein the venting includes injecting gas or clean dry air into the bonding chamber after an upper stage of the bonding chamber begins to move upward, but before a final raised position is reached by the upper stage.

4. A method as claimed in claim 1, wherein the venting includes injecting gas or clean dry air into the bonding chamber when an upper stage of the bonding machine begins to move upward.

5. A method as claimed in claim 1, wherein the venting includes:
starting to inject gas or clean dry air into the bonding chamber; and
moving an upper stage in the bonding machine upward.

6. A method as claimed in claim 1 wherein the venting includes:
finishing to inject gas or clean dry air into the bonding chamber, and
moving an upper stage in the bonding machine upward.

7. A method as claimed in one of claims 2–6, wherein the step for moving the upper stage in the bonding machine upward includes blowing gas or clean dry air through a plurality of vacuum channels formed in the upper stage.

8. A method as claimed in one of claims 2–6, wherein the gas or clean dry air is injected into the bonding chamber through a top portion of the bonding chamber.

9. A method as claimed in one of claims 2–6, wherein the gas or clean dry air is injected into the bonding chamber through a bottom portion of the bonding chamber.

10. A method as claimed in one of claims 2–6, wherein the gas is N2.

11. A method as claimed in claim 1, wherein the venting includes providing venting at a pressure of about 0.4–3.0 kg/cm2.

12. A method as claimed in claim 1, further comprising holding the bonded substrates to the lower stage in the chamber before venting the bonding chamber.

13. A method as claimed in claim 1, wherein the venting includes injecting gas or clean dry air into the bonding chamber in two steps.

14. A method as claimed in claim 1, wherein the unloading includes:
loading at least one of an unbonded first and second substrate on the upper or the lower stage; and
unloading the bonded substrates.

15. A method for fabricating a liquid crystal display (LCD), comprising:
loading a first substrate and a second substrate into a bonding chamber;
providing the first substrate having a liquid crystal applied thereon and the second substrate having no liquid crystal applied thereon, before the loading;
turning the second substrate upside down;
pressing the first and second substrates together, thereby bonding the first and second substrates, wherein the pressing includes pressing the first and second substrates together using at least two pressures;
venting the bonding chamber for applying a pressure to the bonded first and second substrates; and
after the venting, unloading the bonded first and second substrate.

16. A method as claimed in claim 15, wherein the turning of the second substrate upside down includes:
loading the second substrate onto a table of a turner;
and making a pre-alignment;
securing the second substrate to the table;
rotating the table 180°; and
carrying the second substrate to the bonding chamber.

17. A method as claimed in claim 15, further comprising cleaning the second substrate before turning the second substrate upside down.

18. A method for fabricating a liquid crystal display (LCD), comprising:
providing liquid crystal on at least one of the first and second substrates;
loading the first substrate and the second substrate onto lower and upper stages of a bonding chamber, respectively;
flipping at least one of the first and second substrates;
bonding the first and second substrates between the lower and upper stages;
raising the upper stage with respect to the bonded substrates;
venting the bonding chamber for applying an atmospheric pressure to the bonded first and second substrates not before the raising; and
unloading the pressed first and second substrates.

19. A method as claimed in claim 18, wherein the venting includes injecting gas or clean dry air into the bonding chamber after the raising is complete.

20. A method as claimed in claim 18, wherein the venting includes injecting gas or clean dry air into the bonding chamber after the raising begins and before the raising is complete.

21. A method as claimed in claim 18, wherein the venting includes injecting gas or clean dry air into the bonding chamber when the raising begins.

22. A method as claimed in claim 18, further including blowing gas or clean dry air through a plurality of vacuum channels formed in the upper stage.

23. A method as claimed in claim 18, wherein the venting includes injecting gas or clean dry air into the bonding chamber through a top portion of the bonding chamber.

24. A method as claimed in claim 18, wherein the venting includes injecting gas or clean dry air into the bonding chamber through a bottom portion of the bonding chamber.

25. A method as claimed in claim 18, wherein the venting includes providing venting at the atmospheric pressure or at a pressure of about 0.4–3.0 kg/cm2.

* * * * *